(12) United States Patent
Gerendás et al.

(10) Patent No.: US 7,874,159 B2
(45) Date of Patent: Jan. 25, 2011

(54) GAS TURBINE COMBUSTION CHAMBER WALL WITH DAMPENING EFFECT ON COMBUSTION CHAMBER VIBRATIONS

(75) Inventors: Miklós Gerendás, Am Mellensee (DE); Sebastian Bake, Berlin (DE)

(73) Assignee: Rolls-Royce Deutschland Ltd & Co KG (DE)

( * ) Notice: Subject to any disclaimer, the term of this patent is extended or adjusted under 35 U.S.C. 154(b) by 988 days.

(21) Appl. No.: 11/716,618

(22) Filed: Mar. 12, 2007

(65) Prior Publication Data

US 2007/0209366 A1    Sep. 13, 2007

(30) Foreign Application Priority Data

Mar. 10, 2006 (DE) .............. 10 2006 011 247
Mar. 10, 2006 (DE) .............. 10 2006 011 248

(51) Int. Cl.
*F02C 1/00* (2006.01)
*F02G 3/00* (2006.01)
(52) U.S. Cl. .......................................... 60/754; 60/752
(58) Field of Classification Search ............ 60/752–760
See application file for complete search history.

(56) References Cited

U.S. PATENT DOCUMENTS

| | | | | |
|---|---|---|---|---|
| 4,422,300 A | * | 12/1983 | Dierberger et al. | 60/757 |
| 4,695,247 A | * | 9/1987 | Enzaki et al. | 431/352 |
| 5,000,005 A | * | 3/1991 | Kwan et al. | 60/757 |
| 5,435,139 A | * | 7/1995 | Pidcock et al. | 60/757 |
| 5,758,503 A | | 6/1998 | DuBell | |
| 6,260,359 B1 | * | 7/2001 | Monty et al. | 60/752 |
| 6,606,861 B2 | * | 8/2003 | Snyder | 60/752 |
| 6,655,149 B2 | * | 12/2003 | Farmer et al. | 60/754 |
| 6,810,673 B2 | * | 11/2004 | Snyder | 60/752 |
| 6,868,675 B1 | * | 3/2005 | Kuhn et al. | 60/772 |
| 7,051,532 B2 | * | 5/2006 | Howell et al. | 60/772 |
| 7,140,185 B2 | * | 11/2006 | Burd | 60/752 |
| 7,146,815 B2 | * | 12/2006 | Burd | 60/752 |
| 7,219,498 B2 | * | 5/2007 | Hadder | 60/752 |
| 7,464,554 B2 | * | 12/2008 | Cheung et al. | 60/754 |
| 2007/0125093 A1 | * | 6/2007 | Burd et al. | 60/804 |

FOREIGN PATENT DOCUMENTS

| | | |
|---|---|---|
| DE | 43 16 475 A1 | 1/1994 |
| DE | 696 18 842 T2 | 10/2002 |
| EP | 0 972 992 A2 | 1/2000 |
| EP | 14 34 006 A2 | 6/2004 |
| WO | 2006/032633 A1 | 3/2006 |

* cited by examiner

*Primary Examiner*—William H Rodriguez
(74) *Attorney, Agent, or Firm*—Timothy J. Klima; Shuttleworth & Ingersoll, PLC

(57) ABSTRACT

A gas turbine combustion chamber wall has an outer wall skin and an inner wall skin, with the outer wall skin (9) and the inner wall skin (10) being arranged essentially parallel to each other and spaced apart from each other by a gap (14). The outer wall skin (9) is provided with inlet openings (8) for the supply of cooling air. The inner wall skin (10) is provided with dampening openings (17), whose center axes are perpendicular to the inner wall skin (10), and with cooling openings (18), whose center axes are inclined at a certain angle to the inner wall skin (10).

38 Claims, 4 Drawing Sheets

Figure 1:
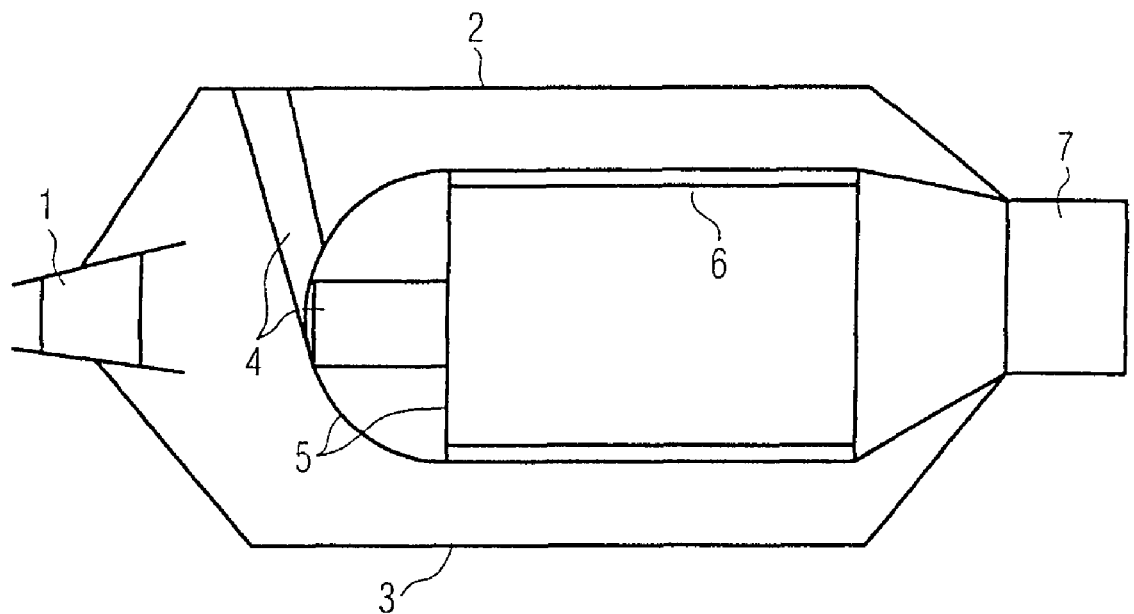

GAS TURBINE COMBUSTION CHAMBER WALL WITH DAMPENING EFFECT ON COMBUSTION CHAMBER VIBRATIONS

This application claims priority to German Patent Application DE102006011247.4 filed Mar. 10, 2006, and German Patent Application DE102006011248.2 also filed Mar. 10, 2006, the entirety of both applications being incorporated by reference herein.

This invention relates to a gas turbine combustion chamber wall.

More particularly, the present invention relates to a gas turbine combustion chamber wall with an outer wall skin and an inner wall skin spaced apart from each other by a gap, with each wall skin being provided with openings for the passage of air.

Specification GB 2 309 296 A describes a double-skin wall design of a lean-burning gas turbine combustion chamber with acoustic dampening effect on high-frequency combustion chamber vibrations (frequency band specified 3 to 9 kHz) and simultaneous cooling of the combustion chamber wall. Both effects are realized by the holes arranged perpendicular to the wall. The outer, cold combustion chamber wall skin produces the impingement cooling jets onto the inner, hot skin, while the holes through the inner, hot wall skin discharge the impingement cooling air into the combustion chamber, producing a dampening effect.

Specification EP 0 576 435 B1 describes a combustion chamber with a double-skin wall design, subdivided into chambers, with all holes being orientated at a shallow angle to the surface.

Specification U.S. Pat. No. 6,907,736 describes, among others, a partitioned damper for a gas turbine combustion chamber which produces a cavity resonance by way of tuning the thickness of the partitioned skin to the frequency to be dampened, thus dampening combustion vibration. Cooling is provided by embedded pipes in the outer, cold skin of the wall design, with these pipes being passed by a fluid (closed circuit of the cooling fluid, for example water vapor).

Since appropriate dampening is only obtainable by holes perpendicular to the combustion chamber wall, cooling of the combustion chamber wall must be ensured by impingement cooling of the rear side of the inner, hot combustion chamber wall skin. With such an arrangement, efficient film cooling is obtainable to a limited degree only. Due to the cooling inefficiency, the state of the art confines the scope of application to that part of the combustion chamber which is in the area of the diverging flame front, thus covering only a fraction of the combustion chamber length. Moreover, a dampening effect in the kHz range (3 to 9 kHz specified) fails to meet the requirements of lean combustion as the first circumferential modes of the usual annular combustion chambers, depending on the size, are in the range of 200 to 1000 Hz.

Cooling of the combustion chamber by a fluid other than compressor exit air, for example water vapor, is to be ruled out for an aircraft engine.

In a broad aspect, the present invention provides a gas turbine combustion chamber wall of the type specified above, which while being characterized by simple design and simple and cost-effective producibility, ensures good cooling and good dampening effects.

It is a particular object of the present invention to provide at least one solution to the above problems by a combination of the features described herein. Further advantageous embodiments of the present invention will become apparent from the description below.

In accordance with the present invention the following has been provided:

The inner, hot combustion chamber wall skin comprises two types of openings or holes, respectively. The first type is generally perpendicular to the surface of the combustion chamber and is responsible for dampening. The second type is oriented at a small angle, for example 15° to 30°, to the surface and is responsible for cooling. Both types are supplied from the gap between the hot and the cold side of the combustion chamber wall with air at the same pressure level, with the gap being providable with one or more longitudinal or circumferential subdivisions. These subdivisions produce chambers with three or more angles which may differ from each other in the pressure level, but with each individual chamber supplying air to dampening holes arranged perpendicular and to cooling holes arranged at a shallow angle to the surface. Since the surface of the combustion chamber must be cooled in its entirety, each chamber contains at least one cooling hole oriented at a shallow angle to the surface. The dampening effect of the perpendicular dampening holes depends on the acoustic natural modes of the combustion chamber so that, with the dampening holes being barely effective in certain areas of the combustion chamber, the chambers, depending on their position within the combustion chamber, contain no, one or several dampening holes.

In another embodiment of the invention, the combustion chamber wall in accordance with the present invention contains two types of sections which are flown by compressor exit air (i.e. have openings on both sides) and can have different geometry, e.g. feature a triangular, rectangular or hexagonal shape. In both types of sections, groups of one or several holes per side may be arranged. The first type contains holes on the hot side of the combustion chamber wall which are perpendicular to the surface of the combustion chamber, with this type of section being responsible for dampening combustion chamber vibrations. The second type contains holes on the hot side of the combustion chamber wall which are arranged at a small angle of 15° to 30°, for example, to the surface, with this type being responsible for cooling. Inflow into the respective section is normally accomplished via perpendicular holes on the cold side of the combustion chamber wall. The functional division into cooling and dampening sections enables the pressure level for feeding the hot-gas side exit holes to be differently set for both types by appropriate selection of the effective flow areas at the entry and exit of the section. The sections have either the same geometrical shape with at least three angles (or four or more angles) or are of a different shape.

The present invention is characterized by the following advantages:

Since the dampening holes are not required to provide a cooling effect (for which they are suitable to a very limited extent only), flow through the dampening holes can be lowered to such a level (commensurate with the hole diameters in the hot and the cold skin of the combustion chamber wall to reduce the pressure difference between plenum and combustion chamber interior) that they produce a substantial dampening effect also at frequencies below one kHz. The necessary cooling of the wall is provided by holes arranged at a shallow angle to the surface.

In order to obtain sufficient cooling air mass flow across the cooling holes despite the lowered pressure difference, the effective area of the cooling holes is correspondingly increased by increasing the number and the diameter of the holes.

The subdivisions of the plenum serve to avoid axial and lateral compensation flows in the plenum which could be produced by the pressure field in the combustion chamber. The subdivisions are, therefore, adapted to this pressure field.

In accordance with the present invention, no further fluid is used for cooling. The dampening openings are dispensed from providing a cooling effect. The functional division enables the flow velocity in the combustion-chamber side exit hole to be optimally set to the respective function of the section type by tuning the hole diameter in the hot and the cold side of the section. Thus, the flow velocity in the dampening openings can be reduced to such a level (by reducing the pressure difference between dampening section and combustion chamber interior) that they produce a substantial dampening effect also at frequencies below 1 kHz. The necessary cooling of the wall is provided by groups of holes of the cooling sections inclined at a shallow angle to the surface.

The cooling and dampening sections can be situated along the combustion chamber wall in dependence of the local dampening and cooling requirements. The cooling sections are arranged at the hotter locations in a pattern with higher density. The dampening sections are arranged in accordance with the acoustic mode forms in the combustion chamber to obtain optimum dampening of the combustion chamber vibrations.

Figure 3:
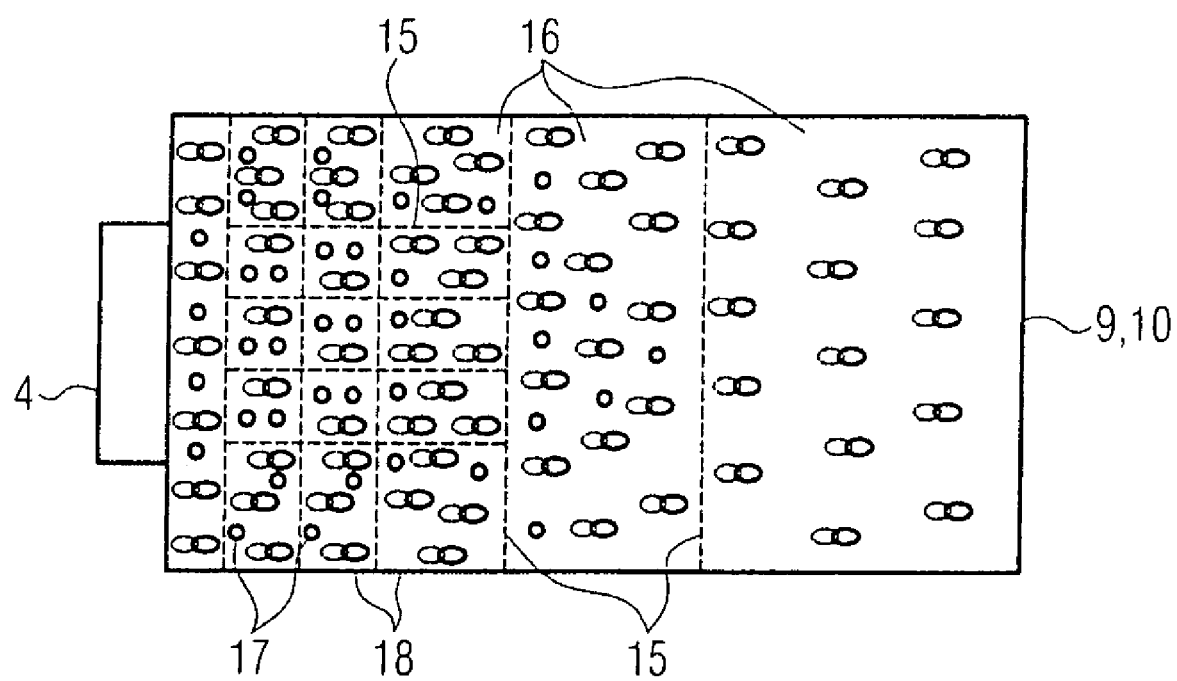
Figure 4:
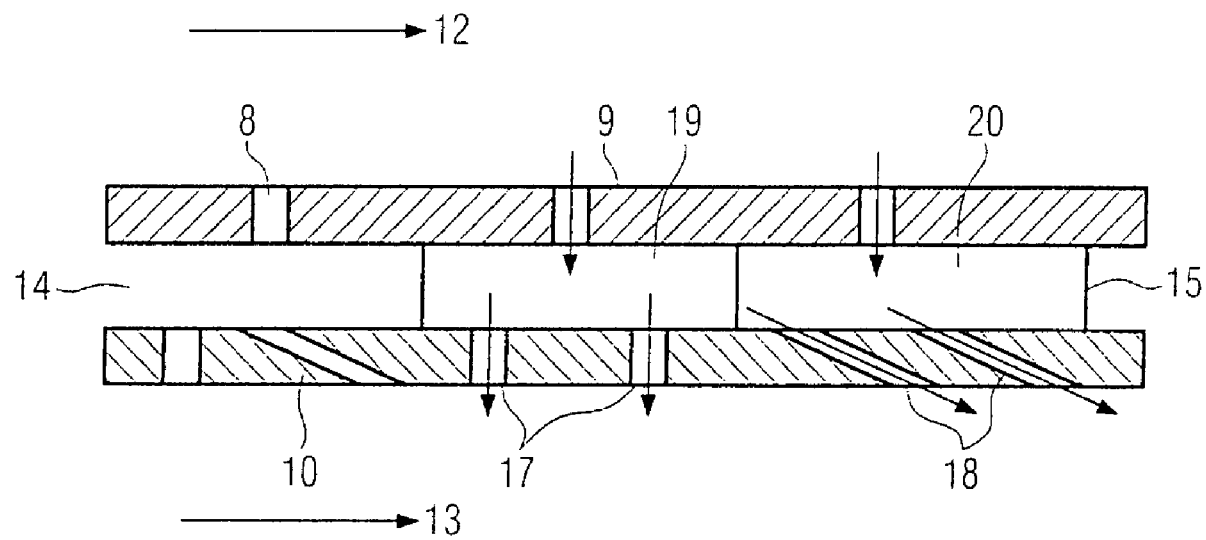
Figure 5:
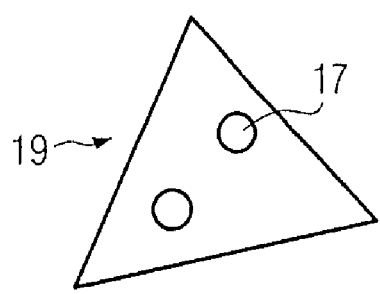
Figure 6:
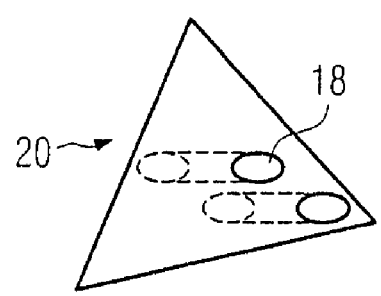
Figure 7:
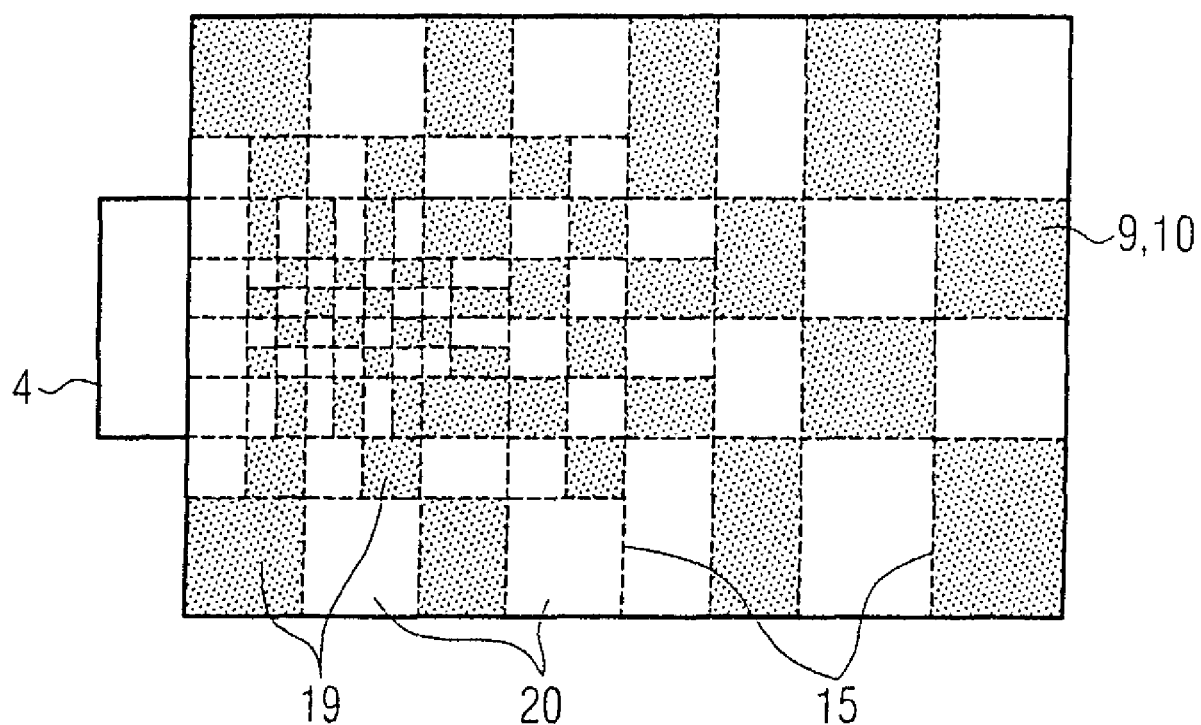

The invention is more fully described in the light of the accompanying drawings showing preferred embodiments. In the drawings, FIG. 1 is a schematic sectional side view of a gas turbine combustion chamber in accordance with the present invention, FIG. 2 is a partial sectional view of an embodiment of the gas turbine combustion chamber wall according to the present invention, FIG. 3 is a view of an embodiment of the combustion chamber wall according to the present invention in the radial direction, FIG. 4 is a partial sectional view of another embodiment of the gas turbine combustion chamber wall according to the present invention, FIG. 5 is a top view of a first dampening section type as per FIG. 4, FIG. 6 is a top view of a second dampening section type as per FIG. 4, and FIG. 7 is a view of a combustion chamber wall according to the present invention as per FIGS. 4 to 6 in the radial direction.

FIG. 1 schematically shows a compressor outlet 1 with vanes as well as a combustion chamber outer casing 2 and a combustion chamber inner casing 3. Reference numeral 4 indicates a burner with arm and head. The combustion chamber dome is schematically indicated by reference numeral 5, it is followed by a multi-skin combustion chamber wall 6. Furthermore, reference numeral 7 schematically indicates turbine inlet vanes.

Figure 2:
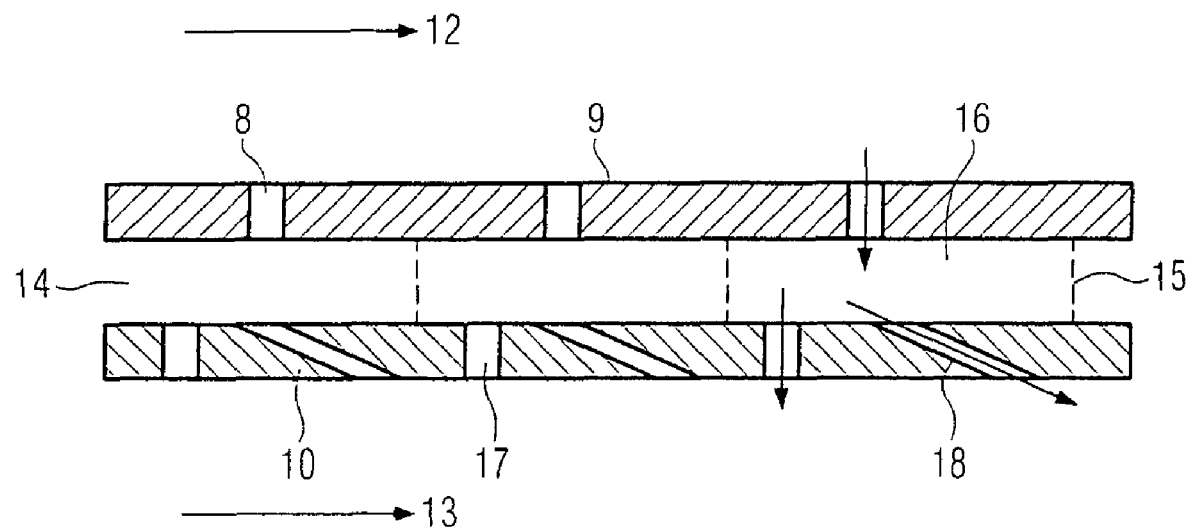

FIG. 2 illustrates the flow of the compressor outlet air, as indicated by arrowhead 12 and, further, the flow direction of the flame and the smoke gas, as indicated by arrowhead 13. An outer, cold combustion chamber wall skin 9 and an inner, hot combustion chamber wall skin 10 form the multi-skin combustion chamber wall 6 as per FIG. 1. The combustion chamber wall skins 9 and 10 are arranged essentially parallel to each other and spaced apart from each other by a gap 14. A multitude of inlet openings 8 are provided in the outer, cold combustion chamber wall skin 9 whose center axes are perpendicular to the plane of the combustion chamber wall skin 9.

The gap 14 is subdivided by several parting walls 15 into various chambers 16.

The inner, hot combustion chamber wall skin 10 comprises dampening openings 17 whose center axes are perpendicular to the plane of the inner combustion chamber wall skin 10 as well as cooling openings 18, which are inclined at a certain angle. The diameters of the dampening openings 17 and of the cooling openings 18 can be sized in accordance with the applicable requirements, they are controlled by the position within the combustion chamber and, as applicable at these positions, the cooling conditions or vibration conditions to be dampened.

FIG. 3 shows a view of the combustion chamber wall in the radial direction. As is apparent, parting walls 15 arranged in longitudinal or circumferential direction, respectively, form several chambers 16 of different size and orientation. Chambers 16 with three, four or more angles can be formed by appropriate orientation of the parting walls 15. As becomes further apparent from the illustration, the dampening openings 17 and the cooling openings 18 are each distributed with different density, so that both the number and size of the chambers 16 and the occupation of the chambers 16 by dampening openings 17 and cooling openings 18 are adapted to the respective conditions.

FIG. 4 illustrates the flow of the compressor outlet air, as indicated by arrowhead 12 and, further, the flow direction of the flame and the smoke gas, as indicated by arrowhead 13. An outer, cold combustion chamber wall skin 9 and an inner, hot combustion chamber wall skin 10 form the multi-skin combustion chamber wall 6 according to FIG. 1. The combustion chamber wall skins 9 and 10 are arranged essentially parallel to each other and spaced apart from each other by a gap 14. A multitude of inlet openings 8 are provided in the outer, cold combustion chamber wall skin 9 whose center axes are perpendicular to the plane of the combustion chamber wall skin 9.

The gap 14 is subdivided by several parting walls 15 into various chambers 16.

The inner, hot combustion chamber wall skin 10 comprises dampening openings 17 whose center axes are perpendicular to the plane of the inner combustion chamber wall skin 10 as well as cooling openings 18, which are inclined at a certain angle. The diameters of the dampening openings 17 and of the cooling openings 18 can be sized in accordance with the applicable requirements, they are controlled by the position within the combustion chamber and, as applicable at these positions, the cooling conditions or vibration conditions to be dampened.

FIGS. 5 and 6 each show views of the two types of sections. In the present example, the sections are triangular, but can, as already mentioned, be rectangular, hexagonal, rhomboid or otherwise. FIG. 5 shows a section 19 which contains two dampening openings 17. Obviously, this is a dampening type of a section. In contrast to this, FIG. 6 shows a cooling type of a section 20 which correspondingly is provided with inclined cooling openings 18.

FIG. 7 shows a side view of a combustion chamber wall in the radial direction. Obviously, the parting walls 15 in the embodiment shown in FIG. 7 produce, or define, rectangular or square sections, respectively. These differ in their design, with sections 19 used for dampening and sections 20 used for cooling being arranged in a pre-defined pattern. This pattern depends on the type and operating conditions of the gas turbine combustion chamber and can be modified and optimized accordingly.

LIST OF REFERENCE NUMERALS

1 Compressor outlet with vanes
2 Combustion chamber outer casing
3 Combustion chamber inner casing
4 Burner with arm and head
5 Combustion chamber dome
6 Multi-skin combustion chamber wall
7 Turbine inlet vanes
8 Inlet opening
9 Outer, cold combustion chamber wall skin
10 Inner, hot combustion chamber wall skin
12 Compressor outlet air
13 Flame and smoke gas
14 Gap between hot (10) and cold (9) combustion chamber wall skin
15 Parting wall
16 Chamber
17 Dampening opening
18 Cooling opening
19 Dampening section
20 Cooling section

What is claimed is:

1. A gas turbine combustion chamber wall comprising:
an outer wall skin;
an inner wall skin, with the outer wall skin and the inner wall skin being arranged essentially parallel to each other and spaced apart from each other by a gap; the outer wall skin including inlet openings for the supply of cooling air, and the inner wall skin including dampening openings having center axes that are generally perpendicular to the inner wall skin and cooling openings having center axes that are inclined at a certain angle to the inner wall skin:
parting walls positioned in the gap between the outer wall skin and the inner wall skin to form chambers essentially in an axial direction.

2. A gas turbine combustion chamber wall in accordance with claim 1, wherein the cooling openings center axes are inclined at an angle of 15° to 30° to the inner wall skin.

3. A gas turbine combustion chamber wall in accordance with claim 1, wherein certain chambers have a level of dampening and certain other chambers have a lesser level of dampening and different pressure levels are respectively maintained in the chambers having different levels of dampening.

4. A gas turbine combustion chamber wall in accordance with claim 3, wherein the different pressure levels in the different chambers are set by selection of effective flow areas at entries and exits of the respective chambers.

5. A gas turbine combustion chamber wall in accordance with claim 4, wherein the certain other chambers having a lesser level of dampening have only cooling openings and there is no dampening from such certain other chambers.

6. A gas turbine combustion chamber wall in accordance with claim 5, wherein the cooling openings center axes are inclined at an angle of 15° to 30° to the inner wall skin.

7. A gas turbine combustion chamber wall in accordance with claim 1, wherein certain chambers each include no dampening openings.

8. A gas turbine combustion chamber wall comprising:
an outer wall skin;
an inner wall skin, with the outer wall skin and the inner wall skin being arranged essentially parallel to each other and spaced apart from each other by a gap; the outer wall skin including inlet openings for the supply of cooling air, and the inner wall skin including dampening openings having center axes that are generally perpendicular to the inner wall skin and cooling openings having center axes that are inclined at a certain angle to the inner wall skin:
parting walls positioned in the gap between the outer wall skin and the inner wall skin to form chambers essentially in a circumferential direction.

9. A gas turbine combustion chamber wall in accordance with claim 8, wherein certain chambers each include at least one cooling opening.

10. A gas turbine combustion chamber wall in accordance with claim 8, wherein certain chambers each include at least one dampening opening.

11. A gas turbine combustion chamber wall in accordance with claim 8, wherein certain chambers have a level of dampening and certain other chambers have a lesser level of dampening and different pressure levels are respectively maintained in the chambers having different levels of dampening.

12. A gas turbine combustion chamber wall in accordance with, claim 11, wherein the different pressure levels in the different chambers are set by selection of effective flow areas at entries and exits of the respective chambers.

13. A gas turbine combustion chamber wall in accordance with claim 12, wherein the certain other chambers having a lesser level of dampening have only cooling openings and there is no dampening from such certain other chambers.

14. A gas turbine combustion chamber wall in accordance with claim 13, wherein the cooling openings center axes are inclined at an angle of 15° to 30° to the inner wall skin.

15. A gas turbine combustion chamber wall in accordance with claim 8, wherein the cooling openings center axes are inclined at an angle of 15° to 30° to the inner wall skin.

16. A gas turbine combustion chamber wall in accordance with claim 8, wherein certain chambers each include no dampening openings.

17. A gas turbine combustion chamber wall comprising:
an outer wall skin;
an inner wall skin, with the outer wall skin and the inner wall skin being arranged essentially parallel to each other and spaced apart from each other by a gap; the outer wall skin including inlet openings for the supply of cooling air, and the inner wall skin including dampening openings having center axes that are generally perpendicular to the inner wall skin and cooling openings having center axes that are inclined at a certain angle to the inner wall skin:
parting walls positioned in the gap between the outer wall skin and the inner wall skin to subdivide the gap into chambers having at least three side walls.

18. A gas turbine combustion chamber wall in accordance with claim 17, wherein certain chambers each include at least one cooling opening.

19. A gas turbine combustion chamber wall in accordance with claim 17, wherein certain chambers each include at least one dampening opening.

20. A gas turbine combustion chamber wall in accordance with claim 19, wherein the certain chambers each include several dampening openings.

21. A gas turbine combustion chamber wall in accordance with claim 17, wherein certain chambers each include no dampening openings.

22. A gas turbine combustion chamber wall in accordance with claim 17, wherein certain chambers each include at least one cooling opening and at least one dampening opening.

23. A gas turbine combustion chamber wall in accordance with claim 22, wherein at least one of the certain chambers includes a plurality of cooling openings.

24. A gas turbine combustion chamber wall in accordance with claim 22, wherein at least one of the certain chambers includes a plurality of dampening openings.

25. A gas turbine combustion chamber wall in accordance with claim 17, wherein certain chambers have a level of dampening and certain other chambers have a lesser level of dampening and different pressure levels are respectively maintained in the chambers having different levels of dampening.

26. A gas turbine combustion chamber wall in accordance with claim 25, wherein the different pressure levels in the different chambers are set by selection of effective flow areas at entries and exits of the respective chambers.

27. A gas turbine combustion chamber wall in accordance with claim 26, wherein the certain other chambers having a lesser level of dampening have only cooling openings and there is no dampening from such certain other chambers.

28. A gas turbine combustion chamber wall in accordance with claim 27, wherein the cooling openings center axes are inclined at an angle of 15° to 30° to the inner wall skin.

29. A gas turbine combustion chamber wall in accordance with claim 17, wherein the cooling openings center axes are inclined at an angle of 15° to 30° to the inner wall skin.

30. A gas turbine combustion chamber wall, comprising:
an outer wall skin;
an inner wall skin, with the outer wall skin and the inner wall skin being arranged essentially parallel to each other and spaced apart from each other by a gap; the outer wall skin including inlet openings for the supply of cooling air, and the inner wall skin including dampening openings having center axes that are generally perpendicular to the inner wall skin and cooling openings having center axes that are inclined at a certain angle to the inner wall skin:
wherein the gap between the outer wall skin and the inner wall skin is subdivided into sections, with at least one dampening opening being arranged in a first type of section, and at least one cooling opening being arranged in a second type of section.

31. A gas turbine combustion chamber wall in accordance with claim 30, wherein all of the types of sections have a same polygonal geometrical shape.

32. A gas turbine combustion chamber wall in accordance with claim 30, wherein at least some of the sections have different geometrical shapes.

33. A gas turbine combustion chamber wall in accordance with claim 30, wherein the cooling openings center axes are inclined at an angle of 15° to 30° to the inner wall skin.

34. A gas turbine combustion chamber wall in accordance with claim 30, wherein at least one cooling opening or one dampening opening, respectively, is arranged in each section.

35. A gas turbine combustion chamber wall in accordance with claim 30, wherein first type of section has a level of dampening and the second type of section has a lesser level of dampening and different pressure levels are respectively maintained in the first and second types of sections.

36. A gas turbine combustion chamber wall in accordance with claim 35, wherein the different pressure levels in the different first and second types if sections are set by selection of effective flow areas at entries and exits of the respective types of sections.

37. A gas turbine combustion chamber wall in accordance with claim 36, wherein the second type of section has only cooling openings and there is no dampening from the second type of section.

38. A gas turbine combustion chamber wall in accordance with claim 37, wherein the cooling openings center axes are inclined at an angle of 15° to 30° to the inner wall skin.

* * * * *